US009185447B2

(12) United States Patent
Klappert et al.

(10) Patent No.: US 9,185,447 B2
(45) Date of Patent: Nov. 10, 2015

(54) METHODS AND SYSTEMS FOR SELECTING CUSTOMIZED CONTROL SCHEMES BASED ON BRAIN ACTIVITY

(71) Applicant: Rovi Guides, Inc., Santa Clara, CA (US)

(72) Inventors: Walter R. Klappert, Los Angeles, CA (US); Camron Shimy, Canyon Country, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 14/230,522

(22) Filed: Mar. 31, 2014

(65) Prior Publication Data

US 2015/0281762 A1    Oct. 1, 2015

(51) Int. Cl.
*H04N 21/422* (2011.01)

(52) U.S. Cl.
CPC ... *H04N 21/42201* (2013.01); *H04N 21/42206* (2013.01); *H04N 21/42226* (2013.01)

(58) Field of Classification Search
CPC .......................... H04N 21/44222; H04H 60/45
USPC .................................................. 725/10, 12, 37
See application file for complete search history.

(56) References Cited

U.S. PATENT DOCUMENTS

| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,716,697 | B2 * | 5/2010 | Morikawa et al. ............... 725/10 |
| 7,761,892 | B2 | 7/2010 | Ellis et al. |
| 8,046,801 | B2 | 10/2011 | Ellis et al. |
| 8,332,883 | B2 | 12/2012 | Lee et al. |
| 8,373,768 | B2 | 2/2013 | Bill |
| 8,392,250 | B2 | 3/2013 | Pradeep et al. |
| 2002/0174430 | A1 | 11/2002 | Ellis et al. |
| 2003/0110499 | A1 | 6/2003 | Knudson et al. |
| 2005/0251827 | A1 | 11/2005 | Ellis et al. |
| 2010/0153885 | A1 | 6/2010 | Yates |
| 2012/0029322 | A1 | 2/2012 | Wartena et al. |
| 2015/0033258 | A1 | 1/2015 | Klappert et al. |

OTHER PUBLICATIONS

Bos, Danny Oude, "EEG-based Emotion Recognition, The Influence of Visual and Auditory Stimuli," Department of Computer Science, University of Twente, 2006.
Frank et al., "Biofeedback in medicine: who, when, why and how?" Ment. Health Fam. Med., Jun. 2010.
Hamadicharef et al., "Learning EEG-based Spectral-Spatial Patterns for Attention Level Measurement," Institute for Infocomm Research, 2009.
Rybak, "Frontal Alpha Power Asymmetry in Aggressive Children and Adolescents With Mood and Disruptive Behavior Disorders," Clinical EEG and Neuroscience, vol. 3, 2006.

(Continued)

*Primary Examiner* — Hunter B Lonsberry
(74) *Attorney, Agent, or Firm* — Ropes & Gray LLP

(57) ABSTRACT

Methods and systems are described herein for a media guidance application that selects a control scheme based on a number of user input types that are distinguishable based on brain activity monitored by a user device. For example, if the media guidance application determines that only two different user input types may be based on brain activity, the media guidance application will select a control scheme that only requires two different functions to select any available media guidance application operations.

20 Claims, 9 Drawing Sheets

(56) References Cited

OTHER PUBLICATIONS

Tan, Bao Hong, "Using a Low-cost EEG Sensor to Detect Mental States," CMU-CS-12-134, School of Computer Science, Carnegie Mellon University, Aug. 2012.

Wyczesany, Miroslaw et al., "Subjective mood estimation co-varies with spectral power EEG characteristics," Department of Psychophysiology, Jagiellonian University, Krakow, Poland, Acta Neurobiol Exp, 68: 180-192, 2008.

Yamasaki et al., "Dissociable prefrontal brain systems for attention and emotion," PNAS, vol. 99, No. 17, 2002.

* cited by examiner

| | | | | |
|---|---|---|---|---|
| Friday 12:44pm<br>March 31, 2006 | | | Brain Monitoring Key<br>A) Concentrate to select | |
| The Simpsons 2 FOX<br>7-7:30 pm TV-14<br>"Kamp Krusty", Repeat,<br>(1992). | | | B) Blink eyes twice to<br>move up<br>C) Blink eyes once to<br>move down | |
| Tue | 7:00 pm | 7:30 pm | 8:00 pm | |
| 2 FOX | The Simpsons | King of the Hill | Joe Millionaire | |
| 3 ABC | The Bourne Identity | | | |
| 4 NBC | Friends | Will & Grace | ER | |
| 5 HBO (VOD) | HBO On Demand | | | |
| Recorded | Display Recorded Program Listings | | | |
| CNN.com | Access CNN.com Video Content | | | |

METHODS AND SYSTEMS FOR SELECTING CUSTOMIZED CONTROL SCHEMES BASED ON BRAIN ACTIVITY

BACKGROUND

Users today have a plethora of options associated with accessing media content. For example, interactive television menus require users to navigate menus and sub-menus, select content, and/or authorize special functions (e.g., fast-forwards, pauses, etc.). To allow users to fully interact with such menus, remote controls typically feature numerous buttons, each associated with distinct user commands (e.g., volume control buttons, fast-forward, pause, rewind buttons, a set of arrow keys, etc.).

Recently, developments in detecting and monitoring brain activity have allowed specialized equipment to distinguish one type of brain activity from another. Despite these advances, controlling access to media (e.g., replacing a traditional remote control and its numerous buttons) with equipment used to detect brain activity faces a substantial hurdle—a distinguishing enough types of brain activity in order to have each user command formally associated with one of the numerous buttons on a remote control mapped to a distinctive type of brain activity.

SUMMARY

Accordingly, methods and systems are described herein for a media guidance application that selects a control scheme based on a number of user input types that are distinguishable based on brain activity monitored by a user device. By selecting a control scheme that corresponds to the number of user input types that may be identified based on the brain activity of a user, the media guidance application allows a user to access media using only the user device that monitors the brain activity (and without a secondary device such as a remote controller). Even more significantly, because the media guidance application can adapt the control schemes to any number of user input types that may be identified based on the brain activity of a user, the media guidance application is not limited to a user device with a particular type of brain monitoring component (e.g., electroencephalogram unit ("EEG"), electromyogram unit ("EMG"), etc.) based on the number of different user input types that are distinguishable with that device, nor is the media guidance application limited to users with experience honing their brain activity to be distinguishable for a particular number of user input types.

For example, if the media guidance application determines that only two different user input types may be based on brain activity (e.g., a monitoring device is only capable of detecting two different brain states), the media guidance application will select a control scheme that requires only two different functions (whether working in combination or alone) to select any available media guidance application operations. The media guidance application may then map the functions to the different user input types, respectively.

In some aspects, the media guidance application may monitor brain activity of a user with a user device. For example, a user device (e.g., configured as headwear) may incorporate an EEG, EMG, or another component capable of monitoring brain activity. In another example, the user device may receive brain activity data from a component capable of monitoring brain activity that is not incorporated into the user device.

The media guidance application may then determine a number of different user input types that are distinguishable based on the monitored brain activity. For example, the media guidance application may determine a number of specific brain states such as the user obtaining a particular mood, a particular level of concentration, a brain activity frequency range above a threshold level, a particular amplitude with any one frequency band, etc. The media guidance application may then use the determined number of brain states to select a corresponding number of different user input types. For example, if the media guidance application determines that two different brain states are distinguishable, the media guidance application may determine the number of different user input types to be two as well.

The media guidance application may then retrieve a list of available media guidance application operations. For example, the list of available media guidance application operations may correspond to all operations (e.g., moving a highlight up one region in a grid, increasing the volume, selecting a highlighted program, etc.) available to the user associated with a currently displayed screen. For example, if the current screen is a menu, the available media guidance application operations may include one or more menu navigation keys. If the current screen is a media asset being played back, the available media guidance application operations may relate to pausing the media asset, increasing the volume of the media asset, etc.

The media guidance application may then determine a control scheme based on the different number of user input types, in which the control scheme maps a function to each user input type such that each of the available media guidance application operations in the list is accessible to the user through the use of one or more mapped functions. For example, if the number of different user input types is one, a control scheme may map a first user input type of the different user input types to correspond to selecting a currently highlighted media guidance application operation in the list, and, as no other different user input type is available, the control scheme may automatically iterate, based on a predetermined schedule, through the media guidance application operations in the list temporarily highlighted, one at a time.

In another example, if the number of different user input types is two, a control scheme may map a first user input type of the different user input types corresponding to selecting a currently highlighted media guidance application operation in the list of available media guidance application operations, and may map a second user input type of the different user input types corresponding to highlighting a different media guidance application operation in the list of available media guidance application operations.

In yet another example, if the number of different user input types is three, a control scheme may map a first user input type of the different user input types to correspond to selecting a currently highlighted media guidance application operation in the list of available media guidance application operations. The control scheme may also map a second user input type of the different user input types to correspond to highlighting a different media guidance application operation in the list of available media guidance application operations in a first direction, and the control scheme may also map a third user input type of the different user input types to correspond to highlighting a different media guidance application operation in the list of available media guidance application operations in a second direction.

The media guidance application may then alert the user of the determined control scheme. For example, the media guidance application may indicate to the user the brain activity that corresponds to each different user input type and the function that is mapped to each different user input type and/or a list of available media guidance application operations on a display screen.

In some embodiments, a number of available media guidance application operations in the list is based on the number of different user input types. For example, if the media guidance application determines that only three different user input types are distinguishable, the media guidance application may list more available media guidance application operations than if only two different user input types are distinguishable.

In some embodiments, the media guidance application may determine the control scheme by cross-referencing the list of available media guidance application operations with a database of control schemes for use with particular numbers of different user input types to determine the control scheme that requires only the use of the number of different user input types to access each of the available media guidance application operations in the list. For example, a database may house control schemes that correspond to various numbers of different user inputs and/or control schemes that correspond to various media guidance application operations. For example, the control scheme may be selected from a plurality of control schemes, in which each of the plurality of control schemes is associated with a particular number of user input types.

It should be noted, the systems, methods, apparatuses, and/or aspects described above may be applied to, or used in accordance with, other systems, methods, apparatuses, and/or aspects.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A shows an illustrative media guidance application featuring a customized control scheme in accordance with some embodiments of the disclosure;

DETAILED DESCRIPTION OF DRAWINGS

Figure 1B:
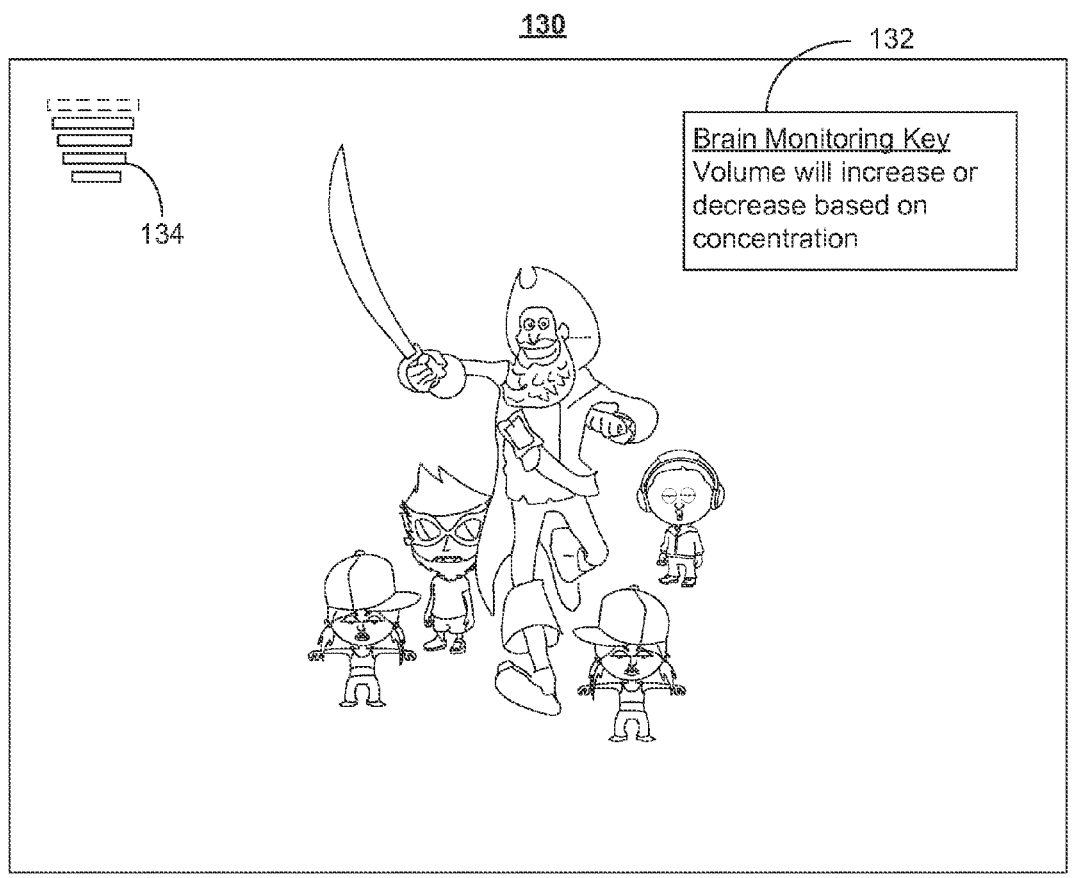
FIG. 1B shows an illustrative media guidance application featuring another customized control scheme in accordance with some embodiments of the disclosure.

Method and systems are described herein for a media guidance application that selects a control scheme based on a number of user input types that are distinguishable based on brain activity monitored by a user device. By selecting a control scheme that corresponds to the number of user input types that may be identified based on the brain activity of a user, the media guidance application allows a user to access media using only the user device that monitors the brain activity (and without a secondary device such as a remote control).

For example, if the media guidance application is limited to basing whether or not a function is performed on only two different user input types (e.g., a monitoring device is capable of detecting only two different brain states), the media guidance application may select a control scheme that compensates for this limitation by requiring only two different functions (whether working in combination or alone) to select any available media guidance application operations. The media guidance application may then map the functions to the different user input types, respectively.

As used herein, "a media guidance application," "interactive media guidance application," or "guidance application" refers to a form of media guidance through an interface that facilitates access to media content. In some embodiments, the media guidance application may be provided as an on-line application (i.e., provided on a website), or as a stand-alone application on a server, user device, etc. Various devices and platforms that may implement the media guidance application are described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

As discussed herein, a user device may incorporate or be associated with a component capable of monitoring brain activity. In some embodiments, the user device may incorporate and/or have access to an electroencephalogram unit ("EEG"). An EEG measures electrical activity associated with a brain of a user. For example, an EEG may measure voltage fluctuations and/or the frequency or frequency range of voltage fluctuations generated by the brain of a user.

For example, an EEG may describe rhythmic brain activity. Rhythmic activity (e.g., activity associated with neural oscillation) also known as brain waves may be described in terms of frequency bands or frequency ranges. For example, a delta band includes a frequency range of up to about 4 Hz with a typical amplitude of 20-200 microvolts. Delta bands are, in some circumstances, associated with a sleeping state of a user. Theta bands include a frequency range of 4 to 8 Hz with a typical amplitude of 10 microvolts. Theta bands are, in some circumstances, associated with drowsiness. Alpha bands include a frequency range of 8 to 13 Hz with a typical amplitude of 20-200 microvolts. Alpha bands are, in some circumstances, associated with a relaxed state and/or the blinking of a user's eyes. Beta bands include frequencies of 13 to 30 Hz with a typical amplitude of 5-10 microvolts. Beta bands are, in some circumstances, associated with alertness, concentration, and/or anxiety. Gamma bands include a frequency range of 30 to 100 Hz and may have various amplitudes. Gamma bands are, in some circumstances, associated with combinations of senses of a user (e.g., sight, smell, sound, touch, taste) and/or short-term memory. Frequency bands and frequency ranges as well as the symmetry of these bands and ranges across the brain of a user are also associated with various moods, which is discussed in detail in Rybak, "Frontal Alpha Power Asymmetry in Aggressive Children and Adolescents With Mood and Disruptive Behavior Disorders," Clinical EEL and Neuroscience, Vol. 3, 2006, which is hereby incorporated by reference herein in its entirety.

Additional discussion about the use of EEGs to detect a level of attention, engagement, frustration, anxiety, emotional state, and comprehension are discussed in detail in Wyczesany, Miroslaw et al., "Subjective mood estimation co-varies with spectral power EEG characteristics," Department of Psychophysiology, Jagiellonian University, Krakow, Poland, Acta Neurobiol Exp, 68: 180-192, 2008, Tan, Bao Hong, "Using a Low-cost EEG Sensor to Detect Mental States, CMU-CS-12-134, School of Computer Science, Carnegie Mellon University, August 2012, Hamadicharef et al., "Learning EEG-based Spectral-Spatial Patterns for Attention Level Measurement," Institute for Infocomm Research, 2009, Bos, Danny Oude, "EEG-based Emotion Recognition, The Influence of Visual and Auditory Stimuli," Department of Computer Science, University of Twente, 2006, and Pradeep et al., U.S. Pat. No. 8,392,250, issued Mar. 5, 2013, Klappert et al., U.S. patent application Ser. No. 14/038,158, filed on Sep. 26, 2013, which are hereby incorporated by reference herein in their entireties.

In some embodiments, the user device incorporates and/or has access to an electromyogram unit ("EMG"). An EMG measures the electrical activity of muscles at rest and during contraction. The use of EMG and EEG for providing biofeedback is discussed in detail in Frank et al., "Biofeedback in medicine: who, when, why and how?" Ment. Health Fam. Med., June 2010, and Wartena et al., U.S. Patent Application Publication No. 2012/0029322, filed Mar. 24, 2010, which is hereby incorporated by reference herein in its entirety. In some embodiments, the user device may include additional components for detecting brain activity, moods, and attentiveness of a user as discussed in detail in Lee et al., U.S. Pat. No. 8,332,883, issued Dec. 11, 2012, and Bill, U.S. Pat. No. 8,373,768, issued Feb. 12, 2013, which are hereby incorporated by reference herein in their entireties.

In some embodiments, a user device may also distinguish between the different areas of the brain and the different functions of each area of the brain. For example, the frontal lobes are typically associated with planning, problem-solving, voluntary motor control, cognition, intelligence, attention, language processing and comprehension, and various emotions. The parietal lobe is typically associated with perception and integration of somatosensory information (e.g., touch, pressure, temperature, and pain) visuospatial processing, spatial attention, spatial mapping, and number representation. The occipital lobe is typically associated with vision, including color, orientation, and motion. The temporal lobe is typically associated with recognition, perception, hearing, smell, and memory. The regions and functions of the brain, in particular their effect on attention and emotion, are discussed in detail in Yamasaki et al., "Dissociable prefrontal brain systems for attention and emotion," PNAS, vol. 99, no. 17, 2002, which is hereby incorporated by reference in its entirety.

In some embodiments, a user device may be configured as a headset. As used herein a "headset" refers to any device or article worn or affixed to a user for monitoring brain activity. For example, a user device for monitoring brain activity may be fashioned as a pair of headphones, a hat, a helmet, a pair of glasses, and/or other configuration for use by a user. In some embodiments, a headset may be powered by a local energy storage device (e.g., a battery). For example, in some embodiments, a headset may be rechargeable and/or include replaceable energy storage devices.

The media guidance application (or a user device upon which the media guidance application is implemented) may manage power consumption of the user device based on brain activity of a user. For example, the media guidance application may operate in a plurality of modes, each associated with a power consumption and/or sensitivity level. For example, the media guidance application (or the user device upon which the media guidance application is implemented) may trigger various modes on the user device based on a change (or lack of change during a period of time) in brain activity (e.g., a brain state, frequency range, etc.).

In some embodiments, a user device may be configured to monitor brain activity upon which various media guidance application operations and features may be based. The user device and/or a media guidance application implemented or associated with may then determine a number of different user input types that are distinguishable based on the monitored brain activity.

As used herein, "a user input type" refers to a condition, associated with the brain activity of the user and under the control of a user, that when met (or not met) triggers the occurrence of a function mapped to the user input type by a control scheme. As described herein, a user input type is distinguishable from other user input types and/or other brain activity. That is, the media guidance application is capable of determining when the condition associated with the user input type is occurring or not occurring.

In some embodiments, the media guidance application may associate user input types with any command or function associated with media guidance (e.g., dedicated buttons on a traditional remote control, common menu options, etc.). For example, the media guidance application may be associated any user input type with any particular function. For example, one user input type may be associated with the "volume up" button on a traditional remote control and another user input type may be associated with the "volume down" button on a traditional remote control. Alternatively or additionally, one user input type may be associated with the "play" button on a traditional remote control and another user input type may be associated with the "fast-forward" button on a traditional remote control. Alternatively or additionally, one user input type may be associated with the "channel up" command on a traditional remote control and another user input type may be associated with the "channel down" command on a traditional remote control. Alternatively or additionally, one user input type may be associated with a navigation arrow "up" command (e.g., typically user to scroll listings in on-screen media guides) and another user input type may be associated with a navigation arrow "down" command.

The user input type may be associated with any characteristic of brain activity. For example, the user input type may refer to whether or not a specific brain state such as the user obtaining a particular mood, a particular level of concentration, a brain activity frequency range above a threshold level, a particular amplitude with any one frequency band, etc., is occurring.

As used herein, a user input type is distinguished from an automatic input type in that "an automatic input type" refers to a condition, not associated with the brain activity of the user and not under the control of a user, that when met (or not met) triggers the occurrence of a function mapped to the automatic input type by a control scheme. For example, an automatic input type may be triggered automatically by the media guidance application (e.g., on a predetermined schedule) or triggered automatically in response to the performance of a previous function, media guidance application operation, etc. For example, if the number of different user input types is one, a control scheme may map a first user input type of the different user input types to correspond to selecting a currently highlighted media guidance application operation in the list, and, as no other different user input type is available, the control scheme may trigger an automatic input type to iterate, based on a predetermined schedule, through the media guidance application operations in a list and temporarily highlight each media guidance application operation in the list, one at a time.

As referred to herein, a "brain state" refers to a quantitative or qualitative assessment of brain activity. For example, a qualitative assessment of brain activity may include the mood, level of anxiety, level of attentiveness, level of comprehension, level of proficiency associated with one or more functions (e.g., reading text on a screen, hearing audio, etc.) of a user, and/or a combination thereof associated with the brain activity of the user. A quantitative assessment of a brain state may include whether or not brain activity meets a particular threshold range of brain activity, the current frequency range of voltage fluctuations in the brain, electrical activity of muscles near the brain at rest and during contraction, etc.

As referred to herein, a "threshold range" refers to a frequency range and/or amplitude of brain activity that defines the boundaries of a brain state. For example, a threshold range may be defined as a particular frequency range (in Hz) associated with a brain activity of a user, may be defined as frequency bands associated with brain activity of a user, and/or may be defined according to any other measurement that describes the current, preferred, past, and/or future brain activity of a user. In some embodiments, a threshold range may account for any transient variations and amplitudes in brain state. For example, a threshold range may be defined as an average amplitude, frequency, frequency range, and/or frequency band over a particular period of time.

In addition, a threshold range may refer to a composite range that includes one or more amplitudes and/or frequencies associated with one or more waves. For example, in some embodiments, a particular brain state may correspond to brain activity corresponding to theta bands with a first amplitude and delta bands at a second amplitude.

It should also be noted that in some embodiments, a threshold range may itself include one or more threshold ranges. For example, a threshold range associated with one brain state (e.g., a user being awake) may itself include numerous other threshold ranges (e.g., a mood of the user, an attentiveness level of the user, etc.).

Brain states may be identified by a user device (e.g., upon which a media guidance application is implemented) that incorporates and/or has access to a device for monitoring brain waves (e.g., an EEG, EMG, and/or any other device discussed herein). The media guidance application may monitor the brain activity (e.g., brain waves) of a user and determine multiple brain states of the user based on the brain activity. For example, the different user input types may each correspond to a particular brain state.

For example, whether or not a user currently has a first brain state (e.g., whether or not a user has a particular level of concentration) may indicate whether or not a first function (as mapped to a first user input type associated with the first brain state) is triggered. Likewise, whether or not a user currently has a second brain state (e.g., whether or not a user has a delta band with a 200 microvolt amplitude) may indicate whether or not a second function (as mapped to a second user input type associated with the second brain state) is triggered.

For example, the media guidance application and/or the control scheme may indicate that a first brain state corresponds to a particular frequency range of voltage fluctuations in the brain, electrical activity of muscles near the brain at rest and during contraction, and/or threshold range, and that a second brain state corresponds to a different frequency range of voltage fluctuations in the brain, electrical activity of muscles near the brain at rest and during contraction, and/or threshold range. If the user currently has a brain state corresponding to the first brain state, then a function associated with a media guidance application operation (e.g., changing a channel) is triggered. If the user currently has a brain state corresponding to the second brain state, then a function associated with a different media guidance application operation (e.g., increasing volume of a display device) is triggered. If the user currently has a brain state corresponding to both the first and the second brain state, then both functions are triggered. Likewise, if the user currently has a brain state corresponding to neither the first nor the second brain state, then neither function is triggered.

To determine whether a mood of a user corresponds to a brain state, the media guidance application may cross-reference data associated with the brain state of the user (e.g., a frequency range, an electrical activity of the muscles near the brain, and/or a threshold range) with a database associated with data related to brain states and corresponding moods. For example, based on the cross-reference, the media guidance application may determine that the data associated with the brain state of the user indicates that the user is confused, nervous, etc.

The media guidance application may also calibrate and/or perform a training/set-up mode. For example, the media guidance application may receive information from the user, in which the user describes and/or rates current brain states of the user. For example, during calibration, the media guidance application may detect a brain state and ask the user to describe the state (e.g., designate the state as associated with a particular mood). The current brain state of the user (e.g., the current threshold range) will then be designated as corresponding to the particular mood. Additionally or alternatively, the media guidance application may receive instructions designating a particular brain state as corresponding to a particular mood. For example, the media guidance application may retrieve/receive instructions that indicate that a threshold range of 8 to 10 Hz indicates that the particular user is in a happy mood. Additionally, the media guidance application may retrieve/receive instructions that indicate that a threshold range of 10 to 13 Hz indicates that the particular user is in a sad mood. In another example, if the average amplitude of a threshold range is 50 microvolts and an average frequency range is 7 Hz, the media guidance application may determine that the threshold range indicates that a user is currently anxious.

The media guidance application may also offer training opportunities. For example, the media guidance application may also offer tips or instructions for achieving a particular brain state. For example, the media guidance application may generate on-screen instructions for achieving and/or maintaining particular brain states (e.g., moods, attentiveness levels, frequency ranges, etc.). The media guidance application may also provide training opportunities for generating distinguishable user input types. For example, the media guidance application may provide instructions for obtaining alpha bands, delta bands, etc. with particular frequencies (e.g., in order to allow the media guidance application to detect more different user input types when monitoring brain activity).

The media guidance application may perform numerous operations for the user. As referred to herein, a "media guidance application operation" refers to any operation corresponding to providing, receiving, and generating media guidance data for consumption by a user. For example, media guidance application operations include displaying media guidance data, providing options to navigate, select, and edit media guidance data or content (e.g., a media asset) associated with media guidance data, and/or manipulating a device used to access (e.g., a display device), retrieve (e.g., a server), and/or associate media guidance data with a user (e.g., a user device for monitoring brain activity). One of the operations of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Other operations of a media guidance application are to play media assets and provide fast access playback operations for those media assets. As referred to herein, the phrase "fast-access playback operations" should be understood to mean any media guidance application operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed.

In some embodiments, the media guidance application may retrieve a list of available media guidance application operations. For example, the list of available media guidance application operations may correspond to all operations (e.g., moving a highlight region up one region in a grid, increasing the volume, selecting a highlighted program, etc.) available to the user associated with a currently displayed screen. For example, if the current screen is a menu, the available media guidance application operations may include one or more menu navigation keys. If the current screen is media asset being played back, the available media guidance application operations may relate to pausing the media asset, increasing the volume of the media asset, etc.

In some embodiments, a number of available media guidance application operations in the list is based on the number of different user input types. For example, if the media guidance application determines that only three different user input types are distinguishable, the media guidance application may list more available media guidance application operations than if only two different user input types are distinguishable.

In some embodiments, the media guidance application may alert a user to available media guidance application operations by a textual (e.g., a textual list of media guidance application operations that may be performed), graphical (e.g., an on-screen remote control that intuitively signals to the user available media guidance application operations), or audio presentation (e.g., an announcement encouraging the user to concentrate in order to perform a media guidance application operation). As used herein, "an alert" refers to any content that notifies a user regarding the presence of, or how to perform, any media guidance application operation.

In some embodiments, the media guidance application may generate an alert that indicates to the user a current control scheme. For example, the media guidance application may indicate to the user the brain activity that corresponds to each different user input type and the function that is mapped to each different user input type and/or a list of available media guidance application operations on a display screen.

As used herein, "a control scheme" refers to a configuration that associates, assigns, and/or maps different user input types and/or automatic inputs to particular functions in order to provide a user with access to one or more media guidance application operations. For example, the media guidance application may then determine a control scheme based on the different number of user input types, in which the control scheme maps a function to each user input type such that each of the available media guidance application operations in the list is accessible to the user through the use of one or more mapped functions. For example, if the number of different user input types is one, a control scheme may map a first user input type of the different user input types to correspond to selecting a currently highlighted media guidance application operation in the list, and, as no other different user input type is available, the control scheme may automatically iterate, based on a predetermined schedule, through the media guidance application operations in the list temporarily highlighted, one at a time.

In another example, if the number of different user input types is two, a control scheme may map a first user input type of the different user input types corresponding to selecting a currently highlighted media guidance application operation in the list of available media guidance application operations, and may map a second user input type of the different user input types corresponding to highlighting a different media guidance application operation in the list of available media guidance application operations.

In yet another example, if the number of different user input types is three, a control scheme may map a first user input type of the different user input types to correspond to selecting a currently highlighted media guidance application operation in the list of available media guidance application operations. The control scheme may also map a second user input type of the different user input types to correspond to highlighting a different media guidance application operation in the list of available media guidance application operations in a first direction, and the control scheme may also map a third user input type of the different user input types corresponding to highlighting a different media guidance application operation in the list of available media guidance application operations in a second direction.

In some embodiments, the media guidance application may determine the control scheme by cross-referencing the list of available media guidance application operations with a database of control schemes for use with particular numbers of different user input types to determine the control scheme that requires only the use of the number of different user input types to access each of the available media guidance application operations in the list. For example, a database may house control schemes that correspond to various numbers of different user inputs and/or control schemes that correspond to various media guidance application operations. For example, the control scheme may be selected from a plurality of control schemes, in which each of the plurality of control schemes is associated with a particular number of user input types.

FIGS. 1A-C and 2 show illustrative display screens that may be used to provide media guidance data. The display screens shown in FIGS. 1A-C and 2 may be implemented on any suitable user equipment device or platform. While the displays of FIGS. 1A-C and 2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1A shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Display 100 also includes video region 122. Video region 122 currently displays an alert that notifies a user of a determined control scheme. For example, options region 126 informs the user of media guidance application operations that are currently available. As display 100 relates to a media guide, the media guidance application operations relate to navigating and selecting a media listing from the media guide. It should be noted that in some embodiments, the media guidance application may change the available media guidance application operations, functions associated with different user input types, automatic input types, control scheme, etc., based on the current display. For example, as discussed in relation to FIGS. 1B and 1C, the control schemes may vary as a user selects and/or consumes various content.

FIG. 1B shows an illustrative media guidance application featuring another customized control scheme. For example, in some embodiments, the media guidance application may generate a display of an on-screen icon that indicates an available media guidance application operation or the relation of a user's brain activity to performance of a media guidance application operation.

For example, in order to provide a user with guidance related to performing media guidance application operations using his or her brain waves, the media guidance application may provide a user feedback associated with his/her brain activity. For example, the media guidance application may generate audio/visual cues related to a current brain state of the user and/or preferred brain state (or progress towards a preferred brain state) of the user. For example, the media guidance application may monitor the brain activity of the user associated with a first brain state that is associated with performing a first operation of the media guidance application (e.g., navigating about, or accessing a menu in, a media guide, selecting a media listing, performing a fast-access playback operation, etc.). The media guidance application may generate for display an icon on a display screen that provides feedback to the user related to achieving the first brain state, and in response to detecting a change in the brain activity of the user, the media guidance application may adjust the icon on the display screen to reflect the change in the brain activity of the user.

The icon may include a graphical representation of the brain activity associated with a brain state of the user (e.g., a graph indicating a current attentiveness level associated with a user). and a graphical representation indicating the user's progress towards the first brain state (e.g., a graph indicting an attentiveness level goal and a user's current progress towards that goal). Additionally or alternatively, the icon may include textual information (e.g., descriptions of media guidance applications that may be performed and the brain states needed to trigger each operation) and/or instructions (e.g., instructions on how to achieve a particular brain state). Additionally or alternatively, the icon may include audio information (e.g., sound effects, verbal instructions, etc.).

In FIG. 1B, the media guidance application has currently generated a display of icon 134 on display 130. Icon 134 indicates the current volume of the media asset and may indicate the progress of a user in raising or lowering the volume. Display 130 also includes alert 132, which indicates to the user that the volume will increase or decrease based on the concentration of the user. In some embodiments, the concentration of the user may correspond to a threshold attentiveness level.

As used herein, a "threshold attentiveness level" refers to a particular attentiveness level required for the media guidance application to perform an operation. For example, in response to detecting that the current attentiveness level of a user exceeds the threshold attentiveness level, the media guidance application may raise the volume associated with a media asset. Whereas, in response to detecting that the current attentiveness level of a user does not exceed the threshold attentiveness level, the media guidance application may lower the volume associated with a media asset.

Figure 1C:
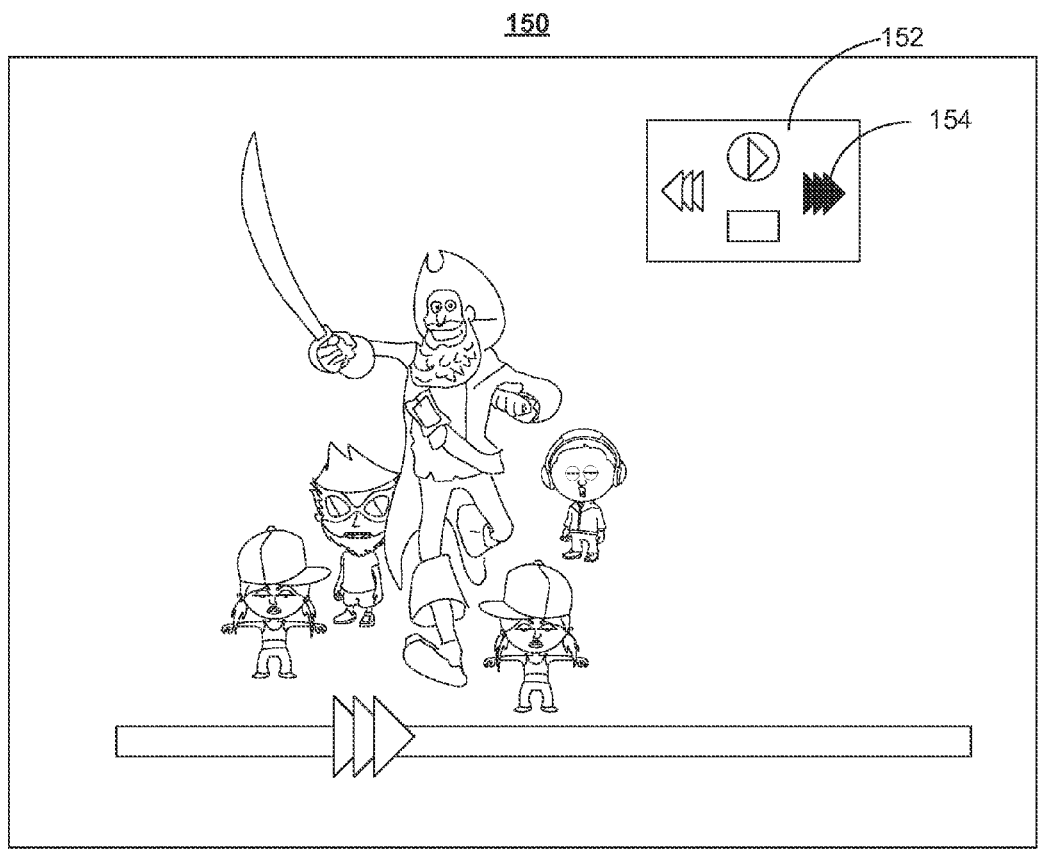
FIG. 1C shows an illustrative media guidance application featuring another customized control scheme in accordance with some embodiments of the disclosure.

FIG. 1C shows an illustrative media guidance application featuring another customized control scheme. In display 150, alert 152 includes numerous fast-access playback operations that are currently available. Moreover, in display 150, alert 152 resembles an on-screen display of a remote control (or inputs typically found on a remote control). Media guidance application operation 154 is currently selected causing the media guidance application to perform a fast-forward operation on the media asset.

In some embodiments, display 150 may include a control scheme that includes both different user input types as well as automatic input types. For example, if the number of different user input types is one, a control scheme may map a first user input type of the different user input types to correspond to selecting a currently highlighted media guidance application operation in alert 152. The control scheme may also activate an automatic input type that causes the media guidance application to automatically iterate, based on a predetermined schedule (e.g., in a clock-wise manner), through the media guidance application operations in alert 152 and temporarily (e.g., for two seconds) highlight (e.g., as shown in accordance with media guidance application operation 154) each of the media guidance application operations in alert 152 one at a time.

Figure 2:
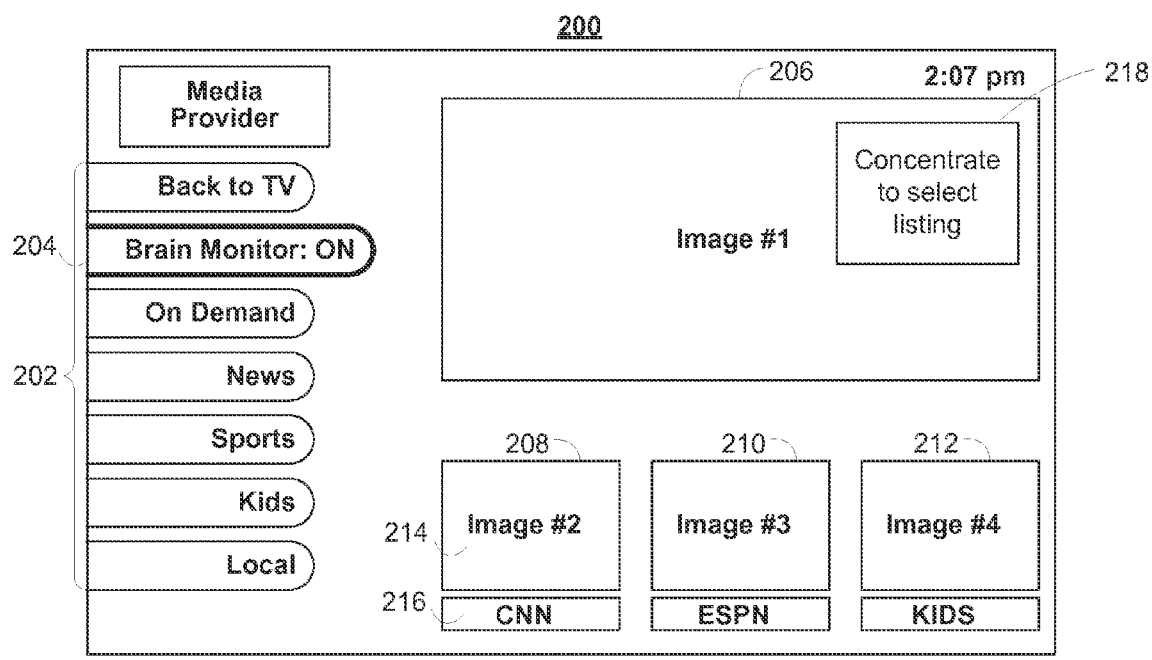
FIG. 2 shows an illustrative media guidance application featuring another customized control scheme in accordance with some embodiments of the disclosure.

Another display arrangement for providing media guidance is shown in FIG. 2. Video mosaic display 200 includes selectable options 202 for content information organized based on content type, genre, and/or other organization criteria. In display 200, selectable option 204 is selected, thus initiating brain monitoring of a user. In some embodiments, selecting selectable option 204 may switch a user device configured to monitor the brain activity of a user from a first mode (e.g., a "sleep mode") to a second mode (e.g., an "active mode").

In response to selectable option 204 being selected, the media guidance application has also generated a display of icon 218, which instructs a user regarding the monitoring of brain activity. For example, icon 218 may instruct a user to blink his/her eyes in order to scroll the different media guidance application operations that are available. For example, the media guidance application may scroll all available media guidance application operations, select a particular operation to monitor for, etc., based on receiving a corresponding eye blink pattern from a user.

As used herein, an "eye blink pattern" refers to a combination of blinks of a user and pauses before or after a blink that causes the media guidance application to perform an action. For example, the media guidance application may be configured to respond to particular eye blink patterns, which may be detected while monitoring brain activity. For example, the media guidance application may monitor alpha bands (e.g., typically associated with eye blinking) in the globus pallidus of the basal ganglia (e.g., the area of the brain typically associated with controlling eye blinking) of a user in order to detect an eye blink pattern. It should be noted that in some embodiments, an eye blink pattern may include only a single blink.

In display 200 listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210, and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
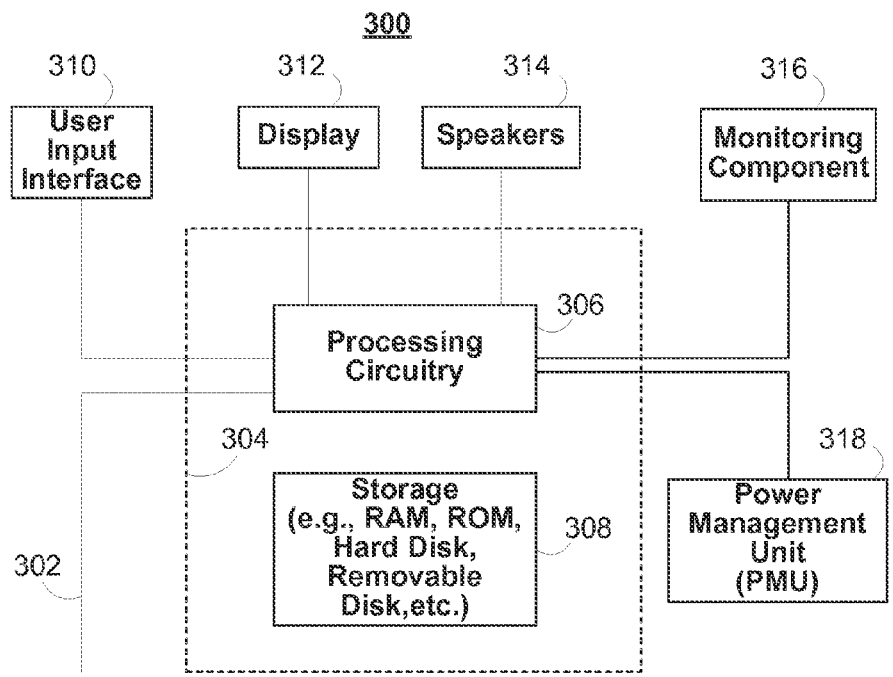
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Control circuitry 304 may also instruct monitoring component 316. Monitoring component 316 may include one or more additional sub-components (e.g., an EEG, EMG, etc.) for monitoring brain activity of a user. Monitoring component 316 may transmit updates (e.g., associated with brain activity) of a user to control circuitry 304. Control circuitry 304 may compare the updates to data related to brain activity (e.g., threshold ranges, frequency ranges, etc.) of the user and/or other users stored on storage 308 (e.g., to determine whether or not the brain activity of the user corresponds to a particular threshold range and/or mood, attentiveness level, etc.).

It should be noted, monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)).

Control circuitry 304 may also instruct power management unit (PMU) 318 to switch user equipment device 300 from a first power mode of operation to a second power mode of operation. Alternatively, PMU 318 may receive instructions to perform the switching directly over communications network 414. For example, monitoring component 316 may send PMU 318 a message telling it to switch user equipment device 300 from a first power mode to a second power mode.

As referred to herein, a first power mode may be a low power mode of operation. A first power mode may be understood to be a sleep mode, a standby mode, a power-off mode, a dormant mode, or a low-power mode. A low-power mode may refer to a mode of operation wherein user equipment device 300 has sufficient power to perform basic computation (e.g., compute whether an update should be performed) using processing circuitry 306 but insufficient power to perform more power-intensive tasks such as communicating with remote devices (e.g., media content source 416 (FIG. 4)) over communications network 414 (FIG. 4) and/or have limited capability to identify brain activity. As referred to herein, a second power mode may be a high power mode of operation. A second power mode may be understood to be an awake mode, an active mode, a full-power mode, a high-power mode, or an update mode, where a device operating at a second power mode has sufficient power to provide updates on brain activity of a user sufficient for determining a mood, attentiveness level, etc. A device operating at a second power mode may consume more power than when operating at a first power mode. In some embodiments, device 300 may operate at a third power mode, wherein the power consumed at the third power mode is greater than that consumed at the first power mode but less than that consumed at the second power mode. A third power mode may be an update mode, wherein device 300 operates at enough power to perform updates but not at full-power mode to perform media guidance application operations. A third power mode may also refer to a low-power mode, as described above. All three modes of operation (e.g., first power mode, second power mode, third power mode) may be used interchangeably within the present disclosure.

Once user equipment device 300 is switched to a second power mode of operation, control circuitry 304 updates the media guidance application with data from monitoring component 316 and stores the data in storage 308. As referred to herein, switching refers to activating a component of circuitry within user equipment device 300 that corresponds to a desired power mode of operation. Switching may be performed by PMU 318 to switch user equipment device 300 from a first power mode to a second power mode. A first power mode may correspond to a first circuitry component, and a second power mode may correspond to a second circuitry component. As referred to herein, switching from a first power mode to a second power mode involves deactivating the first circuitry component and activating a second circuitry component.

PMU 318 monitors and manages the power consumption of user equipment device 300. PMU 318 may be configured to monitor the current level of power consumption of user equipment device 300 based on device characteristics such as, but are not limited to, battery usage information, screen brightness, screen saver settings, central processing unit (CPU) power usage, graphic processing unit (GPU) power usage, integrated processor power usage, number of applications currently running on user equipment device 300, number and frequency of recordings scheduled to be performed on user equipment device 300, and the current power mode of operation (e.g., first power mode, second power mode) in addition to brain activity. More specifically, PMU 318 monitors the power state of user equipment device 300 to determine when device 300 switches from a first power mode to a second power mode. In some embodiments, PMU 318 may reside on user equipment device 300 as a component of control circuitry 304. In other embodiments, PMU 318 may be a unit that is external to user equipment device 300. In these cases, PMU 318 may communicate with user equipment device 300 by sending and receiving instructions from control circuitry 304.

PMU 318 may perform the switching in response to various conditions, based on instructions from control circuitry 304. In some embodiments, control circuitry 304 may receive an indication to switch user equipment device 300 from a first power mode to a second power mode. For example, control circuitry 304 may receive a request from a user input interface 310 or monitoring component 316 to perform the switching. In another example, control circuitry 304 may receive over communications network 414 (FIG. 4) via path 302 a message from a remote server indicating that user equipment device 300 should be switched to a second power mode of operation. In each of the aforementioned examples, control circuitry 304 may instruct PMU 318 to switch user equipment device 300 to a second power mode of operation in response to the requests and messages received. These messages and/or requests may include a time field which indicates a future time at which control circuitry 304 should switch device 300 to a second power mode to receive updates over network 414 (FIG. 4) and/or perform updates that are stored in storage 308. This time field may set a timer to switch user device 300 to a second power mode at a specified time. The time field may also set a timer to switch user device 300 to a first power mode at a specified time period when no updates will be sent to device 300.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
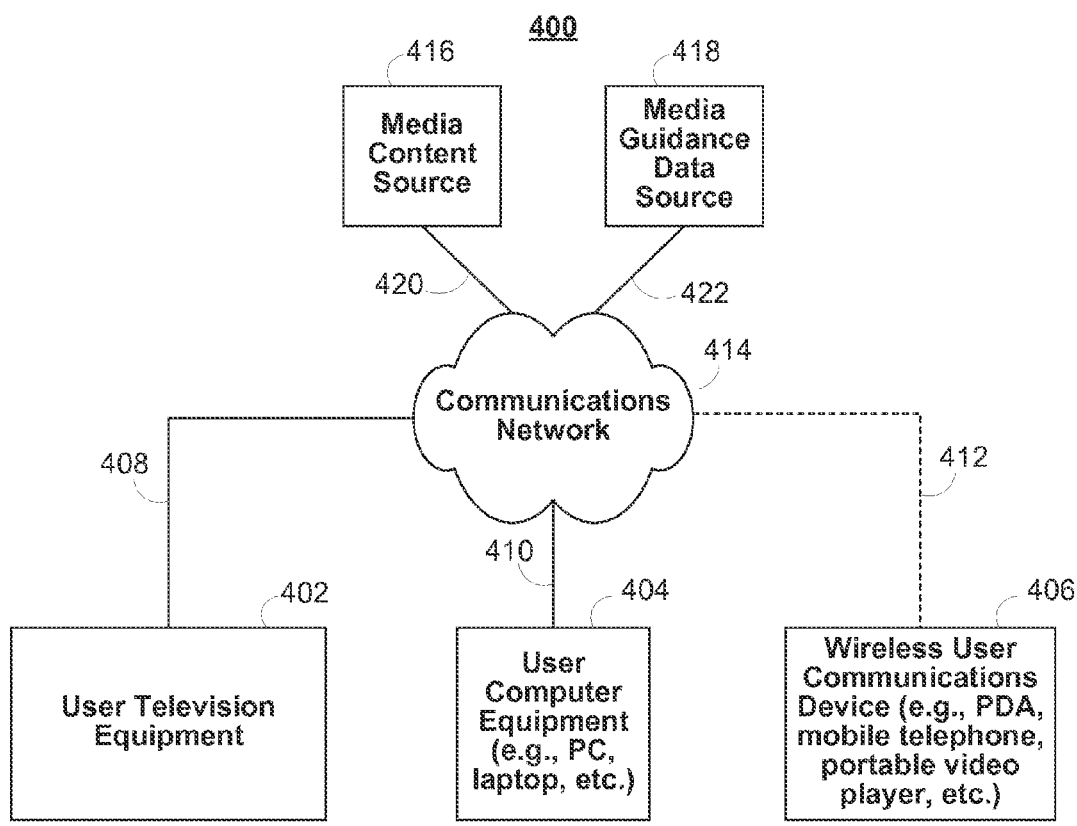
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired).

Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412.

Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an on-line media guidance application on a website via a personal computer at their office, or a mobile device such as a PDA or web-enabled mobile telephone. The user may set various settings (e.g., recordings, reminders, or other settings) on the on-line guidance application to control the user's in-home equipment. The on-line guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of on-line services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
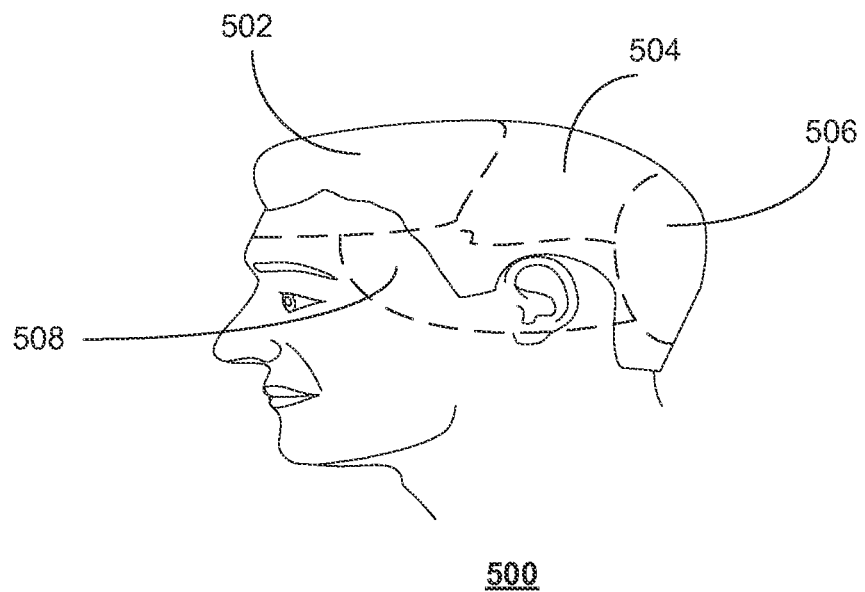
FIG. 5 shows a representation of a user and regions of the brain of the user associated with monitoring brain activity in accordance with some embodiments of the disclosure.
Figure 5:
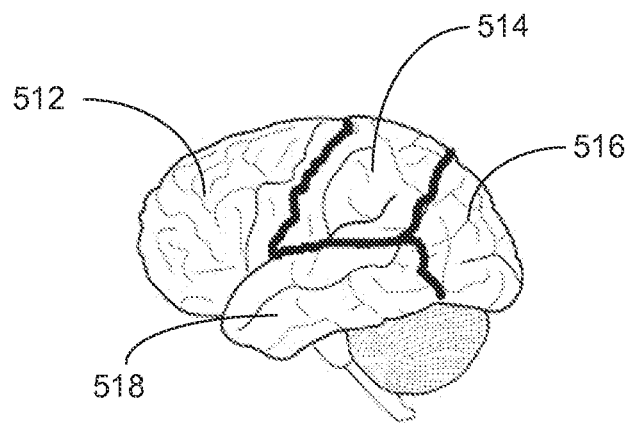

FIG. 5 shows a representation of a user and regions of the brain of the user associated with monitoring brain activity. For example, in some embodiments, the media guidance application may be implemented upon (or be in communication with) a user device that monitors brain activity of a user (e.g., via monitoring component 316 (FIG. 3)). The user device may reside upon the head of a user and include components (or sub-components) for testing different areas of the scalp of a user.

For example, the scalp of user 500 includes first portion 502, second portion 504, third portion 506, and fourth portion 508. In some embodiments, each of first portion 502, second portion 504, third portion 506, and fourth portion 508 may correspond to a different region of brain 510. For example, in some embodiments, first portion 502 may correspond to frontal lobe 512, second portion 504 may correspond to parietal lobe 514, third portion 506 may correspond to occipital lobe 516, and fourth portion 508 may correspond to temporal lobe 518.

For example, in some embodiments, the media guidance application may perform a media guidance application operation in response to brain activity detected in a particular region of the brain of a user. For example, the media guidance application may monitor brain activity of the user in portion 502 (e.g., using monitoring component 316 (FIG. 3)) and determine a first brain state associated with frontal lobe 512 of the monitored brain activity. The media guidance application may then cross-reference portion 502 with a database associated with functions performed by the user using regions of the brain to determine at least one function the user is performing based on the brain activity of the user in portion 502. For example, the cross-reference may reveal that frontal lobe 512 is associated with generating emotions and emotional responses in a user.

The media guidance application may then compare the first brain state to a threshold range for performing the at least one function, and in response to determining the first brain state does not correspond to the threshold range, performing a media guidance operation associated with the at least one function.

For example, the media guidance application may detect a state of the brain activity associated with frontal lobe 512 of the user. In response to determining that frontal lobe 512 is associated with emotions, the media guidance application may compare the current brain state of the user to typical brain states (e.g., of the user or all users) associated with a particularly preferred emotion (e.g., happiness). In response to determining that the brain state of the user does not correspond to the preferred emotion (currently happy), the media guidance application may replace the media assets currently being consumed by the user with a media asset with a higher likelihood of making the user happy.

In another example, the media guidance application may detect a state of the brain activity associated with various regions of the brain in order to perform a function. For example, the media guidance application may detect a state of the brain activity associated with occipital lobe 516 (e.g., associated with vision) and parietal lobe 514 (e.g., associated with reading) of the user. In response to determining that the brain state of the brain activity associated with occipital lobe 516 (e.g., associated with vision) and parietal lobe 514 (e.g., associated with reading) of the user does not correspond to the typical brain state of a user, while temporal lobe 518 (e.g., associated with hearing) does correspond to the typical brain state of the user, the media guidance application may modify the media assets, display settings, etc., such that text or important events are communicated to the user via verbal means (e.g., audio announcements).

Figure 6:
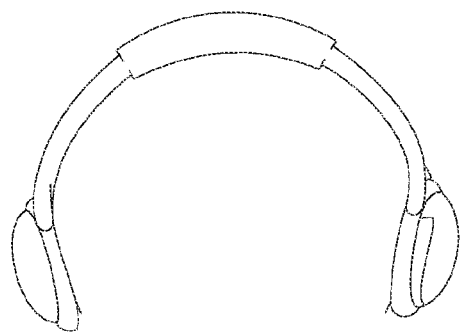
FIG. 6 shows multiple user devices that may be associated with monitoring brain activity in accordance with some embodiments of the disclosure.
Figure 6:
Figure 6:
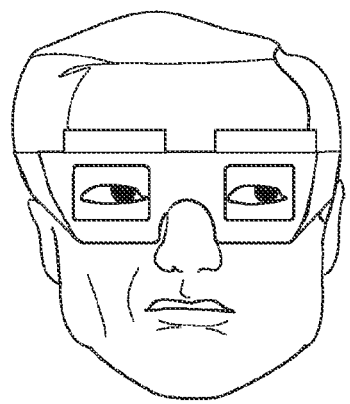

FIG. 6 shows multiple user devices that may be associated with monitoring brain activity. For example, a user device (e.g., upon which a media guidance application is implemented and/or which a media guidance application is in communication with) may be fashioned as a form of headwear.

For example, user device 600 is fashioned as a headset, user device 630 is fashioned as a hat/helmet, and user device 660 is fashioned as eyeglasses. It should be noted that a user device configured to monitor brain activity as described herein may be fashioned as any headwear. Furthermore, in some embodiments, a user device may not be fashioned as headwear, but instead may be configured as any device capable of monitoring brain activity of a user. For example, any device that may incorporate and/or have access to an EEG, EMG, and/or other means for monitoring brain activity described herein may constitute a user device.

In some embodiments, user devices 600, 630, and 660 may further include additional sub-components (e.g., sub-components of monitoring component 316 (FIG. 3)), which may monitor brain activity on one or more regions of the brain. Sub-components may include electrodes or other features that may attach to the various portions (e.g., portions 502, 504, 506, and 508 (FIG. 5)) of a user (e.g., user 500 (FIG. 5)). Furthermore, in some embodiments, sub-components may extend and/or retract during various modes of the user device in order to accommodate the comfort of the user.

In some embodiments, user devices 600, 630, and 660 may be battery-powered in order to provide a user with additional mobility. Furthermore, user devices 600, 630, and 660 include multiple modes, each corresponding to different power consumption levels and/or sensitivity levels.

Figure 7:
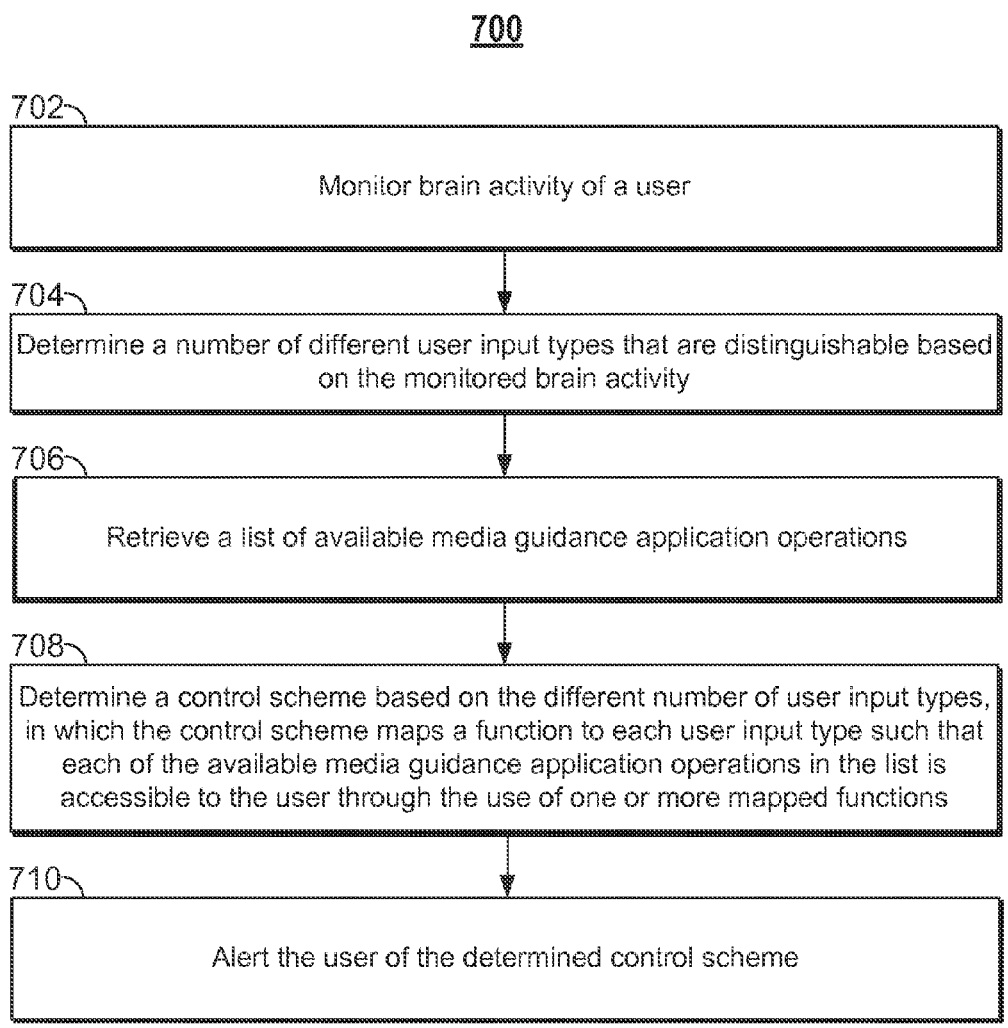
FIG. 7 is a flow-chart of illustrative steps involved in determining a control scheme in accordance with some embodiments of the disclosure.

FIG. 7 is a flow-chart of illustrative steps involved in determining a control scheme. It should be noted that process 700 or any step thereof could be performed on, or provided by, any of the devices shown in FIG. 3-4 or 6. For example, process 700 may be executed by control circuitry 304 (FIG. 3) as instructed by a media guidance application implemented on a user device (e.g., user equipment devices 402, 404, and/or 406 (FIG. 4)) in order to determine whether to determine a control scheme based on the different number of user input types that are distinguishable based on monitored brain activity. In addition, one or more steps of process 700 may be incorporated into or combined with one or more steps of any other process or embodiment (e.g., process 800 (FIG. 8)).

At step 702, a media guidance application may monitor (e.g., via control circuitry 304 (FIG. 3)) brain activity of a user with a user device. For example, a user device (e.g., user device 600, 630, or 660 (FIG. 6)) may incorporate an EEG, EMG, or other component capable monitoring brain activity (e.g., monitoring component 316 (FIG. 3)). In another example, the user device may receive brain activity data (e.g., via I/O path 302 (FIG. 3)) from a component capable of monitoring brain activity that is not incorporated into the user device.

At step 704, the media guidance application determines a number of different user input types that are distinguishable based on the monitored brain activity. For example, the media guidance application may determine (e.g., via control circuitry 304 (FIG. 3)) a number of specific brain states such as the user obtaining a particular mood, a particular level of concentration, a brain activity frequency range above a threshold level, a particular amplitude with any one frequency band, etc. The media guidance application may then use the determined number of brain states to select (e.g., via control circuitry 304 (FIG. 3)) a corresponding number of different user input types. For example, if the media guidance application determines (e.g., via control circuitry 304 (FIG. 3)) that two different brain states are distinguishable, the media guidance application may determine (e.g., via control circuitry 304 FIG. 3)) the number of different user input types to be two as well.

At step 706, the media guidance application retrieves (e.g., from storage 308 (FIG. 3) and/or any location accessible via communications network 414 (FIG. 4)) a list of available media guidance application operations. For example, the list of available media guidance application operations may correspond to all operations (e.g., moving a highlight region up one region in a grid, increasing the volume, selecting a highlighted program, etc.) available to the user associated with a currently displayed screen (e.g., display 100 (FIG. 1A), display 130 (FIG. 1B), and/or display 150 (FIG. 1C)). For example, if the current screen is a menu (e.g., as shown in FIG. 1A), the available media guidance application operations may include one or more menu navigation keys. If the current screen is media asset being played back (e.g., as shown in FIGS. 1B and 1C), the available media guidance application operations may relate to pausing the media asset, increasing the volume of the media asset, etc.

At step 708, the media guidance application determines (e.g., via control circuitry 304 (FIG. 3)) a control scheme based on the different number of user input types, in which the control scheme maps a function to each user input type such that each of the available media guidance application operations in the list is accessible to the user through the use of one or more mapped functions. For example, in some embodiments, the media guidance application may determine (e.g., via control circuitry 304 (FIG. 3)) the control scheme by cross-referencing the list of available media guidance application operations with a database (e.g., located at storage 308 (FIG. 3) of any location accessible via communications network 414 (FIG. 3)) of control schemes for use with particular numbers of different user input types to determine the control scheme that requires only the use of the number of different user input types to access each of the available media guidance application operations in the list. For example, the database may house control schemes that correspond to various numbers of different user inputs and/or control schemes that correspond to various media guidance application operations.

The media guidance application may input (e.g., via control circuitry 304 (FIG. 3)) the number of different user input types and the list of available media guidance application operations. The database may then filter the available control schemes according to whether or not the control schemes allow each of the available media guidance application operations to be accessed with the number of different user input types. The database may then output the one or more control schemes that correspond to the inputted criteria. For example, the media guidance application may select (e.g., via control circuitry 304 (FIG. 3)) the control scheme from a plurality of control schemes (e.g., stored in storage 308 (FIG. 3) or at any location accessible via communications network 414 (FIG. 4)), in which each of the plurality of control schemes is associated with a particular number of user input types.

Based on the current control scheme needs, the media guidance application may select (e.g., via control circuitry 304 (FIG. 3)) a current control scheme. In some embodiments, the media guidance application may update the control scheme, functions, and available media guidance application operations continuously or periodically (e.g., each time a new display screen, menu page, or new media asset is accessed.

At step 710, the media guidance application alerts (e.g., via control circuitry 304 (FIG. 3)) the user of the determined control scheme. For example, the media guidance application may indicate (e.g., via alert 132) to the user the brain activity that corresponds to each different user input type and the function that is mapped to each different user input type and/or a list of available media guidance application operations on a display screen.

For example, if the current control scheme requires a user to concentrate to select a channel, the media guidance application may alert (e.g., via control circuitry 304 (FIG. 3)) the user that he needs to concentrate, may indicate the current threshold attentiveness level of the user, and/or any other information that may be desired by the user.

In some embodiments, the media guidance application selects (e.g., via control circuitry 304 (FIG. 3)) a number of available media guidance application operations in the list based on the number of different user input types. For example, if the media guidance application determines (e.g., via control circuitry 304 (FIG. 3)) that only three different user input types are distinguishable, the media guidance application may determine (e.g., via control circuitry 304 (FIG. 3)) to list more available media guidance application operations than if only two different user input types are distinguishable.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 3-4 or 6 could be used to perform one or more of the steps in FIG. 7.

Figure 8:
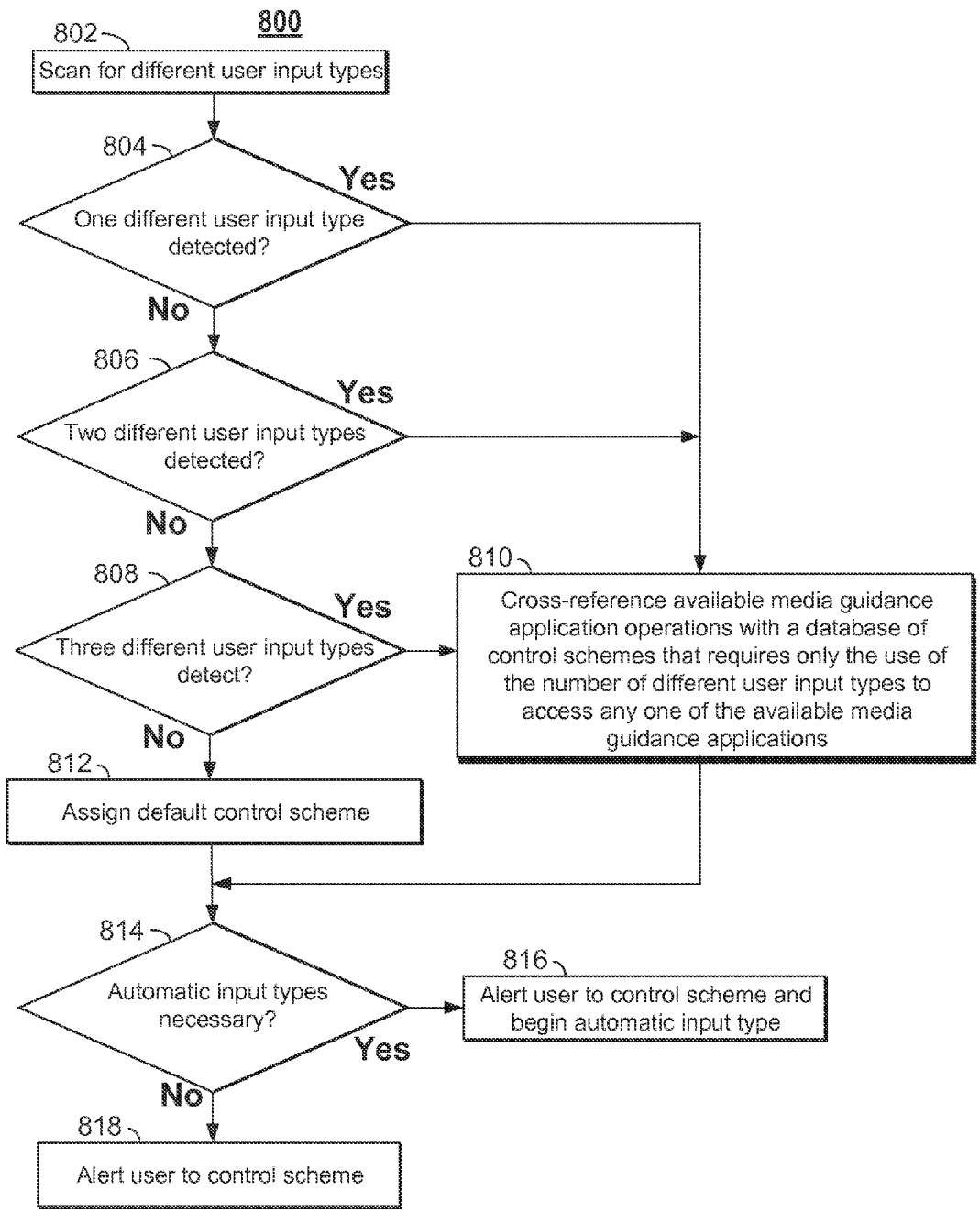
FIG. 8 is a flow-chart of illustrative steps involved in determining a control scheme based on the different number of user input types that are distinguishable based on monitored brain activity in accordance with some embodiments of the disclosure.

FIG. 8 is a flow-chart of illustrative steps involved in determining a control scheme. It should be noted that process 800 or any step thereof could be performed on, or provided by, any of the devices shown in FIG. 3-4 or 6. For example, process 800 may be executed by control circuitry 304 (FIG. 3) as instructed by a media guidance application implemented on a user device (e.g., user equipment devices 402, 404, and/or 406 (FIG. 4)) in order to determine whether to determine a control scheme based on the different number of user input types that are distinguishable based on monitored brain activity. In addition, one or more steps of process 800 may be incorporated into or combined with one or more steps of any other process or embodiment (e.g., process 700 (FIG. 7)).

At step 802, the media guidance application scans (e.g., using monitoring component 316 (FIG. 3)) for different user input types. For example, the media guidance application may determine (e.g., via control circuitry 304 (FIG. 3)) whether or not brain activity associated with specific brain states such as the user obtaining a particular mood, a particular level of concentration, a brain activity frequency range above a threshold level, a particular amplitude with any one frequency band, etc., is distinguishable from the remaining brain activity. If so, the media guidance application determines (e.g., via control circuitry 304 (FIG. 3)) that a user input type may be based on the brain state.

At step 804, the media guidance application determines (e.g., via control circuitry 304 (FIG. 3)) if only one different user input type is detected. If so, the media guidance application proceeds to step 810. At step 810, the media guidance application (e.g., via control circuitry 304 (FIG. 3)) cross-references available media guidance application operations with a database of control schemes that requires only the use of the number of different user input types to access any one of the available media guidance applications For example, as discussed above, the media guidance application may input (e.g., via control circuitry 304 (FIG. 3)) the number of different user input types and the list of available media guidance application operations. The database may then filter the available control schemes according to whether or not the control schemes allow each of the available media guidance application operations to be accessed with the number of different user input types. The database may then output the one or more control schemes that correspond to the inputted criteria. For example, the media guidance application may select (e.g., via control circuitry 304 (FIG. 3)) the control scheme from a plurality of control schemes (e.g., stored in storage 308 (FIG. 3) or at any location accessible via communications network 414 (FIG. 4)), in which each of the plurality of control schemes is associated with a particular number of user input types.

For example, if the number of different user input types is one, the media guidance application may select (e.g., control circuitry 304 FIG. 3)) a control scheme that maps a first user input type of the different user input types to correspond to selecting a currently highlighted media guidance application operation in the list. If the media guidance application determines (e.g., via control circuitry 304 (FIG. 3)) that the number of different user input types detected does not correspond to one, the media guidance application proceeds to step 806.

At step 806, the media guidance application determines (e.g., via control circuitry 304 (FIG. 3)) if two different user input types are detected. If so, the media guidance application proceeds to step 810.

For example, if the number of different user input types is two, the media guidance application may select (e.g., control circuitry 304 FIG. 3)) a control scheme that maps a first user input type of the different user input types corresponding to selecting a currently highlighted media guidance application operation in the list of available media guidance application operations, and that maps a second user input type of the different user input types corresponding to highlighting a different media guidance application operation in the list of available media guidance application operations. If the media guidance application determines (e.g., via control circuitry 304 (FIG. 3)) that the number of different user input types detected does not correspond to two, the media guidance application proceeds to step 808.

At step 808, the media guidance application determines (e.g., via control circuitry 304 (FIG. 3)) if three different user input types are detected. If so, the media guidance application proceeds to step 810.

For example, if the number of different user input types is three, the media guidance application may select (e.g., control circuitry 304 FIG. 3)) a control scheme that maps a first user input type of the different user input types to correspond to selecting a currently highlighted media guidance application operation in the list of available media guidance application operations. The control scheme may also map a second user input type of the different user input types to correspond to highlighting a different media guidance application operation in the list of available media guidance application operations in a first direction, and the control scheme may also map a third user input type of the different user input types corresponding to highlighting a different media guidance application operation in the list of available media guidance application operations in a second direction. If the media guidance application determines (e.g., via control circuitry 304 (FIG. 3)) that the number of different user input types detected does not correspond to three, the media guidance application proceeds to step 812.

At step 812, the media guidance application assigns (e.g., via control circuitry 304 (FIG. 3)) a default control scheme. For example, if no user input types are detected or if any other particular number of user input types are detected, the media guidance application may determine (e.g., via control circuitry 304 (FIG. 3)) to use a default control scheme and proceed to step 814.

At step 814, the media guidance application determines (e.g., via control circuitry 304 (FIG. 3)) whether or not automatic input types are necessary. For example, if the number of different user input types is one, the media guidance application may select (e.g., control circuitry 304 FIG. 3)) a control scheme that maps a first user input type of the different user input types to correspond to selecting a currently highlighted media guidance application operation in the list. As no other different user input type is available for use in navigating to another media guidance application operation for selection, the media guidance application may select a control scheme that includes an automatic input type. For example, as discussed in relation to FIG. 1C, the automatic input type may automatically, without a user input, iterate, based on a predetermined schedule, through the media guidance application operations in the list temporarily highlighted, one at a time.

If automatic input types are necessary, the media guidance application proceeds to step 816 and alerts (e.g., via an on-screen prompt generated for display by control circuitry 304 (FIG. 3)) the user to the determined control schemes and begins the automatic input type. If automatic input types are not necessary, the media guidance application proceeds to step 818 and alerts (e.g., via an on-screen prompt generated for display by control circuitry 304 (FIG. 3)) the user to the determined control schemes.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 3-4 or 6 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing media guidance to users based on customized control schemes, the method comprising:
monitoring brain activity of a user with a user device;
determining, using control circuitry, a number of different user input types that are distinguishable based on the monitored brain activity;
retrieving, using the control circuitry, a list of available media guidance application operations;
determining, using the control circuitry, a control scheme based on the number of different user input types, wherein the control scheme maps a function to each different user input type such that each of the available media guidance application operations in the list is accessible to the user through the use of one or more mapped functions; and
alerting the user of the determined control scheme.

2. The method of claim 1, wherein determining the control scheme based on the number of different user input types, further comprises cross-referencing the list of available media guidance application operations with a database of control schemes for use with particular numbers of different user input types to determine the control scheme that requires only the use of the number of different user input types to access each of the available media guidance application operations in the list.

3. The method of claim 1, wherein the control scheme is selected from a plurality of control schemes, wherein each of the plurality of control schemes is associated with a particular number of user input types.

4. The method of claim 1, wherein the number of different user input types is one, and wherein a first user input type of the different user input types corresponds to selecting a currently highlighted media guidance application operation in the list of available media guidance application operations, and wherein each media guidance application operation in the list of available media guidance application operations is temporarily highlighted, one at a time, based on a predetermined schedule.

5. The method of claim 1, wherein the number of different user input types is two, and wherein a first user input type of the different user input types corresponds to selecting a currently highlighted media guidance application operation in the list of available media guidance application operations, and wherein a second user input type of the different user input types corresponds to highlighting a different media guidance application operation in the list of available media guidance application operations.

6. The method of claim 1, wherein the number of different user input types is three, and wherein a first user input type of the different user input types corresponds to selecting a currently highlighted media guidance application operation in the list of available media guidance application operations, and wherein a second user input type of the different user input types corresponds to highlighting a different media guidance application operation in the list of available media guidance application operations in a first direction, and wherein a third user input type of the different user input types corresponds to highlighting a different media guidance application operation in the list of available media guidance application operations in a second direction.

7. The method of claim 1, wherein the number of different user inputs that are distinguishable in the brain activity is determined based on a number of distinguishable brain states that can be detected during the monitoring.

8. The method of claim 1, wherein a number of available media guidance application operations in the list is based on the number of different user input types.

9. The method of claim 1, wherein alerting the user of the determined control scheme further comprises indicating to the user the brain activity that corresponds to each different user input type and the function mapped to each different user input type.

10. The method of claim 1, further comprising generating for display the list of available media guidance application operations on a display screen.

11. A system for providing media guidance to users based on customized control schemes, the system comprising:
storage circuitry configured to store a list of available media guidance application operations; and
control circuitry configured to:
monitor brain activity of a user with a user device;
determine a number of different user input types that are distinguishable based on the monitored brain activity;
retrieve the list of available media guidance application operations;
determine a control scheme based on the number of different user input types, wherein the control scheme maps a function to each different user input type such that each of the available media guidance application operations in the list is accessible to the user through the use of one or more mapped functions; and
alert the user of the determined control scheme.

12. The system of claim 11, wherein the control circuitry configured to determine the control scheme is further configured to cross-reference the list of available media guidance application operations with a database of control schemes for use with particular numbers of different user input types to determine the control scheme that requires only the use of the number of different user input types to access each of the available media guidance application operations in the list.

13. The system of claim 11, wherein the control circuitry configured to determine the control scheme is further configured to select the control scheme from a plurality of control schemes, wherein each of the plurality of control schemes is associated with a particular number of user input types.

14. The system of claim 11, wherein the number of different user input types is one, and wherein a first user input type of the different user input types corresponds to selecting a currently highlighted media guidance application operation in the list of available media guidance application operations, and wherein each media guidance application operation in the list of available media guidance application operations is temporarily highlighted, one at a time, based on a predetermined schedule.

15. The system of claim 11, wherein the number of different user input types is two, and wherein a first user input type of the different user input types corresponds to selecting a currently highlighted media guidance application operation in the list of available media guidance application operations, and wherein a second user input type of the different user input types corresponds to highlighting a different media guidance application operation in the list of available media guidance application operations.

16. The system of claim 11, wherein the number of different user input types is three, and wherein a first user input type of the different user input types corresponds to selecting a currently highlighted media guidance application operation in the list of available media guidance application operations, and wherein a second user input type of the different user input types corresponds to highlighting a different media guidance application operation in the list of available media guidance application operations in a first direction, and wherein a third user input type of the different user input types corresponds to highlighting a different media guidance application operation in the list of available media guidance application operations in a second direction.

17. The system of claim 11, wherein the number of different user inputs that are distinguishable in the brain activity is determined based on a number of distinguishable brain states that can be detected during the monitoring.

18. The system of claim 11, wherein a number of available media guidance application operations in the list is based on the number of different user input types.

19. The system of claim 11, wherein the control circuitry configured to alert the user of the determined control scheme is further configured to indicate to the user the brain activity that corresponds to each different user input type and the function mapped to each different user input type.

20. The system of claim 11, wherein the control circuitry is further configured to generate for display the list of available media guidance application operations on a display screen.

* * * * *